UNITED STATES PATENT OFFICE 2,527,443

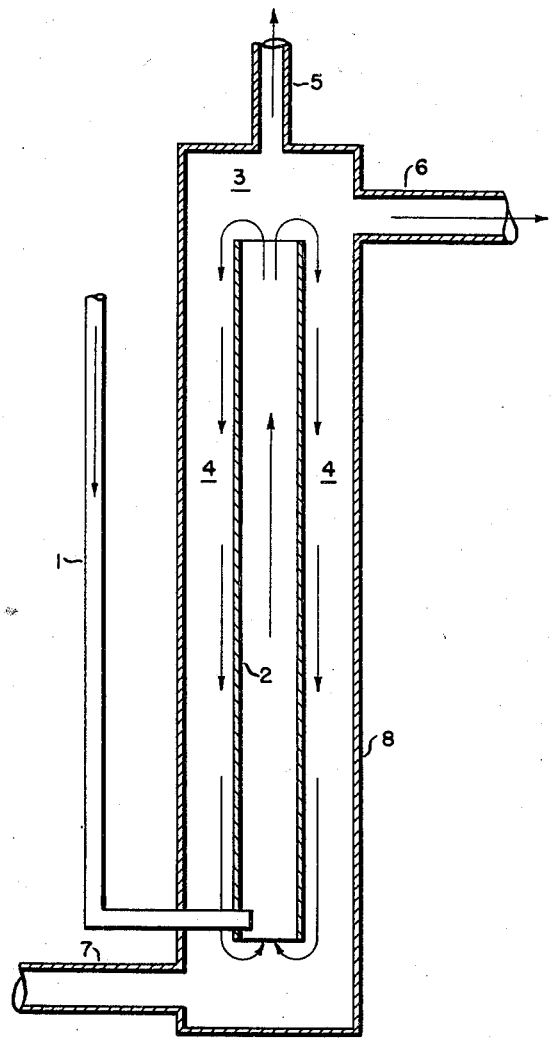

PROCESS FOR DISPOSAL OF MIXTURES OF METALLIC SODIUM AND CALCIUM

Frank L. Padgitt, Baton Rouge, La., assignor to Ethyl Corporation, New York, N. Y., a corporation of Delaware Application February 26, 1948, Serial No. 11,225

1 Claim. (Cl. 23—184)

This invention relates to a method of carrying out chemical reactions, especially exothermic gas-evolving reactions of a solid or liquid with a liquid. This last-named liquid, hereinafter referred to as "disposing liquid," is one which is not a solvent for the material to be reacted, but which reacts exothermically yielding a gas as one of the reaction products.

An object of this invention is to carry out such reactions in a safe manner, without the necessity of mechanical agitation. A specific object is to carry out the reaction of materials containing free alkali metals with aqueous solutions.

The new method is superior to old methods in several respects. The reaction is carried out smoothly in the absence of air with no possibility of fires resulting. No agitating devices are required. The process is conducted so that it provides its own agitation, with uniform contacting of the carrying liquid with the material to be reacted. The process is applicable to batch or continuous operation and to recovery of the by-products. Objectionable smokes or fumes are avoided.

Broadly, the invention is carried out by introducing the material to be reacted into or near the base of a conduit containing an upwardly moving stream predominantly composed of the disposing liquid. Reaction occurs at this point, resulting in formation of gases. The movement of the gas causes the upward movement of the materials, comprising the gases, feed material as yet unreacted, non-gaseous reaction products, and disposing liquid. The movement of the gases also results in turbulent agitative contacting of unreacted feed material and the disposing liquid.

At the top of the channel or conduit, gases are separated and withdrawn. The non-gaseous materials are separately circulated as a downwardly flowing stream. This stream is returned to the base of the conduit containing the upwardly flowing stream.

The method can be carried out as a continuous or a batch process. In continuous operation, part of the downflowing stream, containing non-gaseous reaction products and disposing liquid, is continuously removed. Fresh disposing liquid is introduced at or near the base of the conduit for the upflowing stream.

The process can be carried out through a wide range of temperatures. The selection of temperatures is dependent on the particular system of chemicals involved. In general, suitable temperatures range from atmospheric to the normal boiling point of the disposing liquid. The temperature is easily regulated by controlling the ratio of the disposing liquid to the material fed. Operating temperatures of about 70 to 120 degrees centigrade are quite satisfactory in most cases.

Operating pressures can be varied without difficulty. In general, the operating pressure in the apparatus is maintained sufficiently high to cause positive movement of the gas evolved to the subsequent disposal or recovery operations. Thus, when the gas evolved is vented and burned, a gauge pressure of about five pounds per square inch is adequate.

The process is suitable for operations primarily directed to strengthening or "butting up" aqueous solutions. For example, it is of value for increasing the concentration of sodium hydroxide solutions by addition of sodium metal thereto. In general, air is excluded from the apparatus, especially when processing materials containing the alkali metals. My invention is particularly adapted for the disposal of sodium metal, or alloys or mixtures containing sodium.

My invention will be more readily understood by referring to the drawing which is a cross-sectional view in elevation, showing the flow of materials through one form of the apparatus.

The specific application of disposal of sodium by reaction with aqueous sodium hydroxide is described in connection with the drawing. The sodium, or sodium-bearing material, is introduced by pipe 1 into an open-ended, vertical conduit 2, near the lower end thereof. The conduit 2 is disposed within the vessel 8. The conduit 2 initially contains only disposing liquid comprising a 30 per cent by weight aqueous solution of sodium hydroxide. As sodium-containing material is introduced, it reacts rapidly with the disposing liquid, generating hydrogen and sodium hydroxide. The gas lift action of the hydrogen results in upward movement through conduit 2. The upwardly rising materials include unreacted sodium-bearing material, sodium hydroxide solution, and hydrogen gas. The materials leave the conduit 2 and enter disengaging space 3. Hydrogen gas is separated from the non-gaseous materials, in the disengaging space 3, and is discharged through pipe 5, to a flare line or recovery apparatus.

The non-gaseous material left when hydrogen is separated is predominantly sodium hydroxide solution. If inert solids were originally present in the sodium-bearing material, such solids will also be present. The sodium-bearing material is introduced at a rate such that all the active material has reacted with the aqueous solution by the time the material reaches the top of conduit 2.

The non-gaseous materials leave the disengaging space 3 and flow downwardly through the annular conduit 4 formed between the walls of conduit 2 and vessel 8. This is my preferred construction, but the downward conduit is not necessarily arranged in this manner. The downwardly-flowing material reenters conduit 2 at the lower end or base of conduit 2.

When in continuous operation, a portion of the non-gaseous materials, leaving conduit 2 at the upper or discharge end, is discharged from the apparatus through pipe 6. To compensate for the discharge from the apparatus of the disposing liquid, "make up" liquid, comprising aqueous sodium hydroxide, is added through pipe 7. Instead of sodium hydroxide solution, water can be added in sufficient amount to compensate for the water in the material discharged by pipe 6.

In practice of the above example, the disposing liquid is usually maintained at concentrations of about 30 per cent by weight of sodium hydroxide, although higher or lower concentrations can be used. The usual operating temperature is about 90 degrees centigrade, although the operating temperature is dictated to large degree by the concentration of the sodium hydroxide in the disposing liquid.

The sodium-bearing material can be fed to the apparatus as pellets, as a molten liquid, or as a dispersion in a carrier liquid. Suitable carrier liquids are inert hydrocarbons such as kerosene and the like.

The process was tested by the disposal of a sludge containing free sodium. The sludge composition was about 70 per cent by weight of sodium, 25 per cent by weight of calcium metal, and about 5 per cent by weight of compounds such as sodium or calcium oxides and inert solids. The sludge was reacted with an aqueous solution of sodium hydroxide of a concentration of about 25 to 30 per cent by weight. The sludge was completely reacted with the solution allowing safe disposal of this reactive material and recovery of the sodium content as sodium hydroxide.

The apparatus described herein is only illustrative of my invention since the apparatus can take other forms for carrying out my process.

I claim:

The continuous process for the disposal of a mixture containing metallic sodium and calcium predominating in sodium comprising introducing the mixture into the lower portion of an upflowing stream comprising an aqueous sodium hydroxide solution, substantially completely reacting the sodium content of the mixture with the aqueous solution whereby hydrogen and sodium hydroxide are formed, discharging the reacted mixture to a disengaging space, separating the hydrogen, discharging a portion of the non-gaseous materials and recycling by gravity the rest of the non-gaseous material to a point adjacent the inlet to the upflowing stream and there combining with make up water equivalent to the discharged material and then feeding the mixture to the upflowing stream.

FRANK L. PADGITT.

REFERENCES CITED

The following references are of record in the file of this patent:

UNITED STATES PATENTS

| Number | Name | Date |
|---|---|---|
| 908,545 | Carrier | Jan. 5, 1909 |
| 1,380,067 | Koch et al. | May 31, 1921 |
| 2,083,648 | Gorke | June 15, 1937 |
| 2,392,236 | Edwards | Jan. 1, 1946 |